F. C. HAMILTON.
Nut-Lock.
No. 168,483.  Patented Oct. 5, 1875.
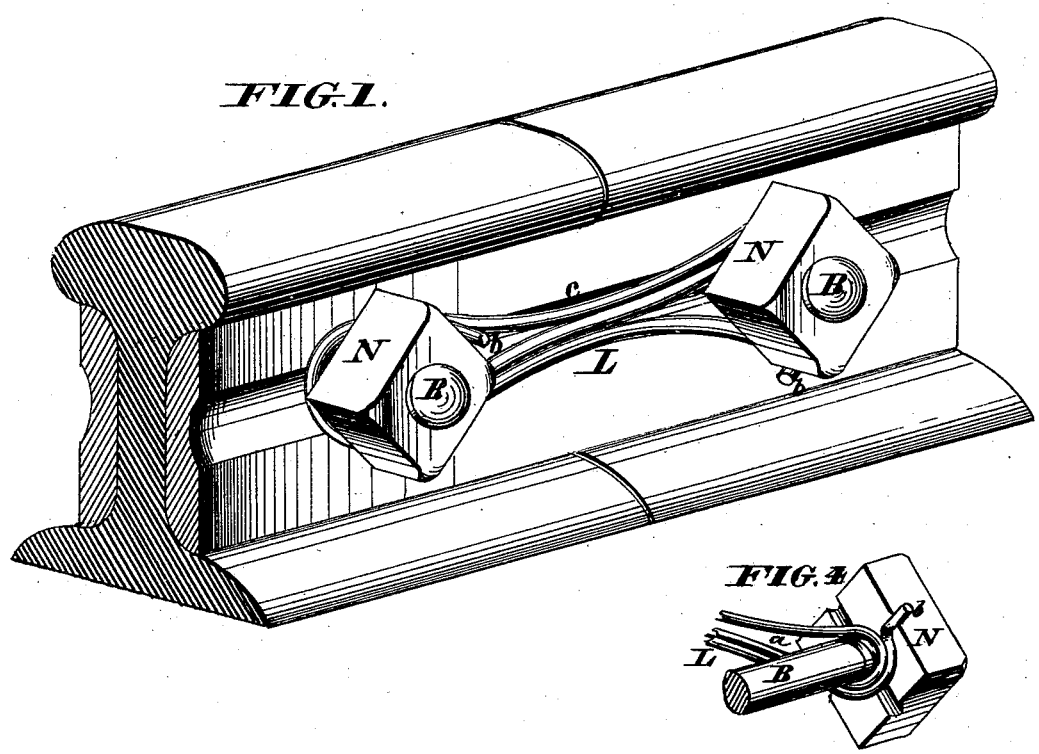
FIG. 1.
FIG. 4.
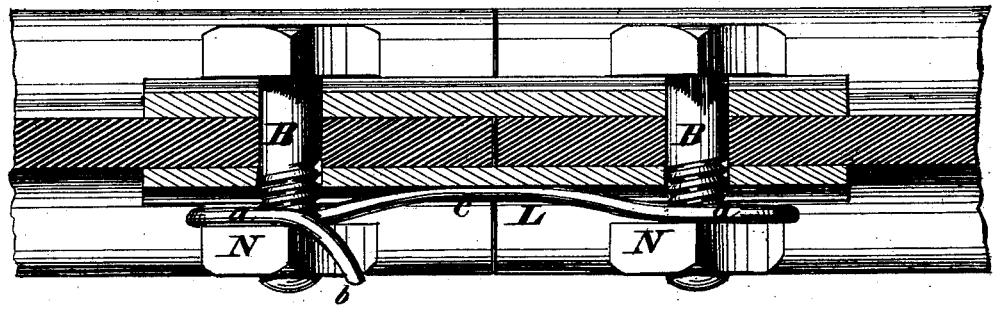
FIG. 2.
FIG. 3.
WITNESSES
Chas. J. Gooch
LeBlond Burdett
INVENTOR
Fred C. Hamilton
By Knight Bros. Attorneys
N. PETERS, PHOTO-LITHOGRAPHER, WASHINGTON, D. C.

UNITED STATES PATENT OFFICE.

FRED. C. HAMILTON, OF BROOKLYN, ASSIGNOR TO EDWARD J. BROOKS, OF NEW YORK, N. Y.

IMPROVEMENT IN NUT-LOCKS.

Specification forming part of Letters Patent No. 168,483, dated October 5, 1875; application filed September 3, 1875.

*To all whom it may concern:*

Be it known that I, FRED. C. HAMILTON, of the city of Brooklyn, in the county of Kings and State of New York, have invented a new and useful Improvement in Nut-Locks, of which the following is a specification:

This invention relates to means for securing the nuts of those bolts which are arranged in pairs in rail-joints and other situations.

The present device is a peculiar spring-washer, which securely locks a pair of nuts on adjacent bolts, and is self-supporting, automatic, and reliable, and is adapted for use in connection with ordinary bolts and nuts without any alteration thereof.

The invention consists in a double spring-washer, having loops to embrace a pair of bolts, and projections to lock the nuts thereon, formed by properly coiling and bending a wire or rod of steel or other suitable metal, and of any preferred form in section, as hereinafter set forth.

Figure 1 is a perspective view of a rail-joint furnished with a nut-lock illustrating this invention. Fig. 2 is a horizontal section of the same. Fig. 3 is a face view or elevation of the double locking-washer.

In Figs. 1 and 2 a pair of screw-bolts, B, with their nuts N, are shown, applied in connection with a pair of fish-plates, to unite the adjoining ends of two railway-rails. All these devices are intended to be of any common or preferred form. For locking the nuts on any such pair of adjacent bolts a locking washer, L, of peculiar construction, has been provided. This has a loop, $a$, and a locking projection, $b$, at each end, united by a semi-elliptical spring-connection, $c$. The loops $a\ a$ embrace the bolts B B and form bearing-surfaces beneath the nuts N N, while the locking-washer is thereby supported against displacement.

The locking projections $b\ b$ are elastic, and are inclined, so as to yield automatically to the nuts as they are screwed down. They project in the circles of the corners of the nuts, and are depressed by these successively. They project as each flat side comes in line, or nearly so, and they resist any backward movement of the nuts by opposing their ends or sides to the sides of the nuts.

The projections may be pressed down by a crow-bar, for instance, so as to release the nuts, and be thus held while the nuts are unscrewed.

The spring-connection $c$ has its central bearing on the contiguous fish-plate in the illustration, as shown in Fig. 2. It supports the loops $a\ a$ in elevated position with sufficient resistance to insure the action of the locking projections while the nuts are still loose. It also insures tightness, and prevents rattling and excessive wear when the nuts are not screwed home properly.

The double locking-washer is made cheaply, and of the utmost strength and durability, by constructing the same of steel, brass, or other suitable wire or rod, coiled and bent so as to form the loops $a\ a$, locking projections $b\ b$, and spring-connections $c$, as already described, the projections being formed by the extremities of the wire or rod, which are both brought to the outside in the proper direction by a peculiar coil. (Shown most clearly in Fig. 3.) The style of coil may vary, however, as also the number of coils, and the wire or rod may be of any preferred sectional shape without departing from the invention.

In an inferior modification the nuts may be provided with lugs, ribs, or grooves, and the locking projections $b$ be adapted to engage therewith, as shown in Fig. 4.

I am aware that a nut-lock has before been used consisting of a curved spring-plate constructed with elongated holes, and with lips, to hold against the sides of the nut. This, therefore, I do not claim.

The following is claimed as new, namely:

A double spring-washer, constructed of wire or rod in the form of a coil, and having loops $a\ a$ to embrace a pair of bolts, and projections $b\ b$ to lock the nuts thereon, substantially as herein shown and described.

FRED. C. HAMILTON.

Witnesses:
WILLIAM A. HARDING, Jr.,
E. J. BROOKS.